US007302063B2

(12) United States Patent
Albus

(10) Patent No.: US 7,302,063 B2
(45) Date of Patent: Nov. 27, 2007

(54) AUDIO SYSTEM FOR AN AUTOMOBILE

(75) Inventor: Rainer Albus, Dormettingen (DE)

(73) Assignee: DaimlerChrysler AG, Stuttgart (DE)

( * ) Notice: Subject to any disclaimer, the term of this patent is extended or adjusted under 35 U.S.C. 154(b) by 873 days.

(21) Appl. No.: 10/332,043

(22) PCT Filed: Jul. 2, 2001

(86) PCT No.: PCT/EP01/07546

§ 371 (c)(1),
(2), (4) Date: Jun. 12, 2003

(87) PCT Pub. No.: WO02/03755

PCT Pub. Date: Jan. 10, 2002

(65) Prior Publication Data

US 2004/0037435 A1 Feb. 26, 2004

(30) Foreign Application Priority Data

Jul. 5, 2000 (DE) ............................... 100 32 666

(51) Int. Cl.
*H04B 1/00* (2006.01)

(52) U.S. Cl. ........................................ 381/86; 381/120

(58) Field of Classification Search .................. 381/86, 381/120, 80, 81, 84; 340/506, 693.3; 455/557
See application file for complete search history.

(56) References Cited

U.S. PATENT DOCUMENTS

| | | | | |
|---|---|---|---|---|
| 4,435,833 | A | 3/1984 | Thakkar | |
| 5,129,004 | A | 7/1992 | Imai et al. | |
| 5,420,931 | A | 5/1995 | Donner | |
| 6,011,465 | A * | 1/2000 | Wang | 340/506 |
| 6,052,603 | A * | 4/2000 | Kinzalow et al. | 455/557 |
| 6,226,497 | B1 * | 5/2001 | Guntzer et al. | 455/557 |

FOREIGN PATENT DOCUMENTS

| | | | |
|---|---|---|---|
| DE | 38 28 634 | A1 | 8/1988 |
| DE | 38 42 417 | A1 | 12/1988 |
| DE | 42 12 337 | A1 | 4/1992 |

* cited by examiner

*Primary Examiner*—Ping Lee
(74) *Attorney, Agent, or Firm*—Crowell & Moring LLP

(57) ABSTRACT

An audio system for a motor vehicle includes a plurality of speaker units to which audio signals from various audio signal sources are supplied. The supply between at least one audio signal source and at least one speaker unit is at least partially redundant, including a primary supply and a secondary supply.

10 Claims, 2 Drawing Sheets

AUDIO SYSTEM FOR AN AUTOMOBILE

BACKGROUND AND SUMMARY OF THE INVENTION

This application claims the priority of German patent document 100 32 666.8, filed 5 Jul. 2000 (PCT International Application No. PCT/EP01/07546, filed 2 Jul. 2001), the disclosure of which is expressly incorporated by reference herein.

The invention relates to an audio system for a motor vehicle.

In a vehicle having multiple audio signal sources, such as a radio, cassette player, CD player, etc, it is known to use the audio speaker units installed in the vehicle for a mobile telephone hands-free device as well. For this purpose, the audio signal source is turned off when a signal is received from the mobile telephone, and the mobile telephone is connected to the speaker units in the vehicle by means of a changeover unit. When the call has ended, the previous audio signal source is again connected to the speaker units.

U.S. Pat. No. 5,420,931 discloses an audio system that includes entertainment systems of varying quality. (In this case, an entertainment system comprises an audio source and an amplifier.) Audio outputs from the high-quality entertainment system, comprising a high-quality audio source and a high-quality amplifier, can be output on all the vehicle speakers or on a subset thereof. It is also possible for audio outputs from the lower-quality entertainment system, comprising a lower-quality audio source and a lower-quality amplifier, to be output on all the vehicle speakers or on a subset thereof. The two systems exist side by side with equal rights. That is, provision is also made for audio signals from one entertainment system to be output on one subset of the vehicle speakers and for audio signals from the other entertainment system to be output simultaneously on the other subset of the vehicle speakers.

German patent document DE 38 28 634 A1 discloses a speaker having two oscillating coils which allows information and warnings to be output on the speaker in addition to an audio signal source. In addition, German patent document DE 38 42 417 A1 discloses an audio system which allows audio messages from a voice memory to be output on speakers; and German patent document DE 42 12 337 A1 discloses a safety system in a vehicle comprising anti-lock protection or traction control systems and restraining systems. It describes redundancy in the form of identical duplicate performance of arithmetic operations.

It is an object of the invention to provide an audio system for a motor vehicle which allows one particular audio signal source or a plurality of particular audio signal source in the vehicle to be reproduced with a very high level of reliability and availability.

This and other objects and advantages are achieved by the audio system according to the invention, which utilizes a multiple design of the connection between a particular audio signal source and a speaker unit, with the high-quality amplifier unit for the primary supply designed redundantly in the secondary supply in the form of an amplifier unit which is provided only for emergencies. Such redundant design makes it possible for audio signals to be reliably output on at least one speaker in an emergency or in an accident situation, for example. This is used, by way of example, to make at least one speaker reliably available to the voice link between an emergency-call center and the vehicle occupants. Alternatively, audio signals can be information/warning tones for the driver which he can hear even if the main part of the audio system has failed.

In one embodiment of the audio system according to the invention, a function check is performed on the primary supply between audio signal source and speaker unit, and the secondary supply is used only if the primary supply has been determined to be faulty. This function check allows the secondary supply to be specifically actuated when required, preventing a reduction in the sound quality or mixing of sources in the normal situation, because the secondary supply is entirely unused in that case.

Another embodiment of the audio system according to the invention, allows reproduction of the particular audio signal source in the best available quality by using, for example, all the speakers in the available audio system (provided that the audio system is still operational) to output the voice link to the emergency-call center. In many cases, the main system will still be operational after an emergency call has been sent, since the latter does not always mean that an accident has occurred. Breakdown could also be the reason for the emergency call, for example. In a breakdown situation, the main system is generally still operational and its high quality can also be used for voice reproduction in an emergency. In this context, the invention affords the advantage that no additional speakers need to be installed for emergency calls, thus reducing both vehicle cost and weight, and saving on installation space as well. For these reasons, dedicated speakers for emergency calls are usually small and are designed to have lesser sound properties. The invention also uses the high-quality main system in an emergency if it is still operational at that time; and even if not, a regular high-quality speaker in the main system is used via the secondary supply in emergencies. This has the overall result of improved sound quality in emergencies.

According to another embodiment of the invention, the function check on the primary supply can be performed at regular intervals, and the secondary supply can be used to output important information if the primary supply is faulty. Such information may comprise, for example, traffic reports, driving instructions from a navigational unit or warning and information tones.

In another advantageous embodiment of the invention, changeover between primary supply and secondary supply is effected by a changeover unit. Such an implementation does not impair the reproduction of the rest of the audio signal sources, since it is possible to dispense with dual-coil speakers. A changeover unit can comprise a control unit and one or more electromechanical or electronic changeover switches.

In still another embodiment of the invention, there is at least one amplifier unit between the audio signal sources and the speaker units, the primary supply between audio signal sources and the amplifier unit being in the form of a data bus. The fact that the primary supply is in the form of a data bus reduces the wiring complexity, and hence the cost and weight of a vehicle. Normally, audio systems use data buses designed for entertainment purposes which have a high level of flexibility and transmission capacity in the foreground. This is where the invention of designing the supply to the amplifier unit to be redundant is particularly advantageous, since the audio signal reaches the amplifier via the secondary supply if the data bus is not working. In this way, such data buses are provided with the reliability and availability necessary for emergencies or warning information.

By installing the audio source, amplifier unit and/or speaker unit at particularly secure locations, the reliability and availability of the audio system are further enhanced.

Finally, according to yet another embodiment of the invention the speaker units are in redundant form, which is particularly beneficial for their use in emergencies, because it further enhances the reliability of the system. This can be achieved, for example, by virtue of the audio signals being supplied to a plurality of speakers at the same time, so that they are output via the intact speaker units every time. Alternatively, it can be achieved by performing a function check on the speaker prior to the supply of an audio signal to it. The audio signal is then output on an operational speaker unit, for example.

Other objects, advantages and novel features of the present invention will become apparent from the following detailed description of the invention when considered in conjunction with the accompanying drawings.

DETAILED DESCRIPTION OF THE DRAWINGS

Figure 1:
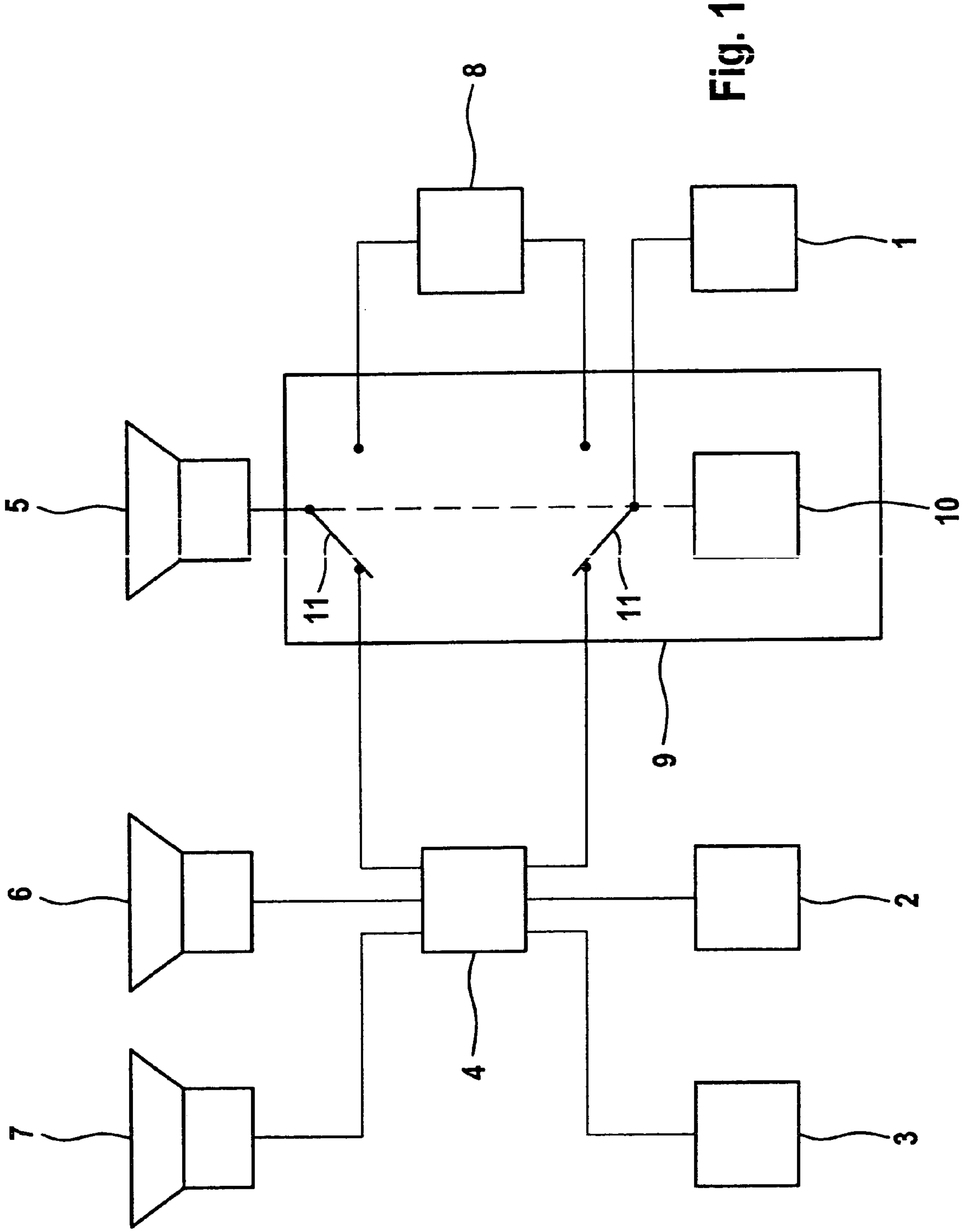
FIG. 1 is a block diagram of an audio system according to the invention.

In normal operation of the audio system shown in FIG. 1, the supply between audio signal sources 1, 2 and 3 runs via an amplifier unit 4 to speaker units 5, 6 and 7. The amplifier unit 4 comprises output stages, preamplifiers and power amplifiers. One of the audio signal sources 1, 2 or 3 is output on the speaker units 5, 6 and 7 or on some of them. It is likewise possible to output two audio signal sources. For example, the audio signal source 2 can be output on the speaker units 5 and 6 and the audio signal source 3 on the speaker unit 7 (which can be in the form of headphones).

The primary supply between the audio signal source 1 and the speaker unit 5 is thus provided via the amplifier unit 4. The secondary supply between the audio signal source 1 and the speaker unit 5 is provided via an amplifier unit 8.

The changeover unit 9 comprises a control unit 10 and two changeover switches 11. The control unit can be in the form of an electronic circuit and the changeover switches 11 can be in the form of relays, for example. The control unit 10 performs the function check on the primary supply between the audio signal source 1 and the speaker unit 5. If a fault is identified in the primary supply, the control unit 10 switches the changeover switches 11, so that the secondary supply between the audio signal source 1 and the speaker unit 5 via the amplifier unit 8 is applied.

Figure 2:
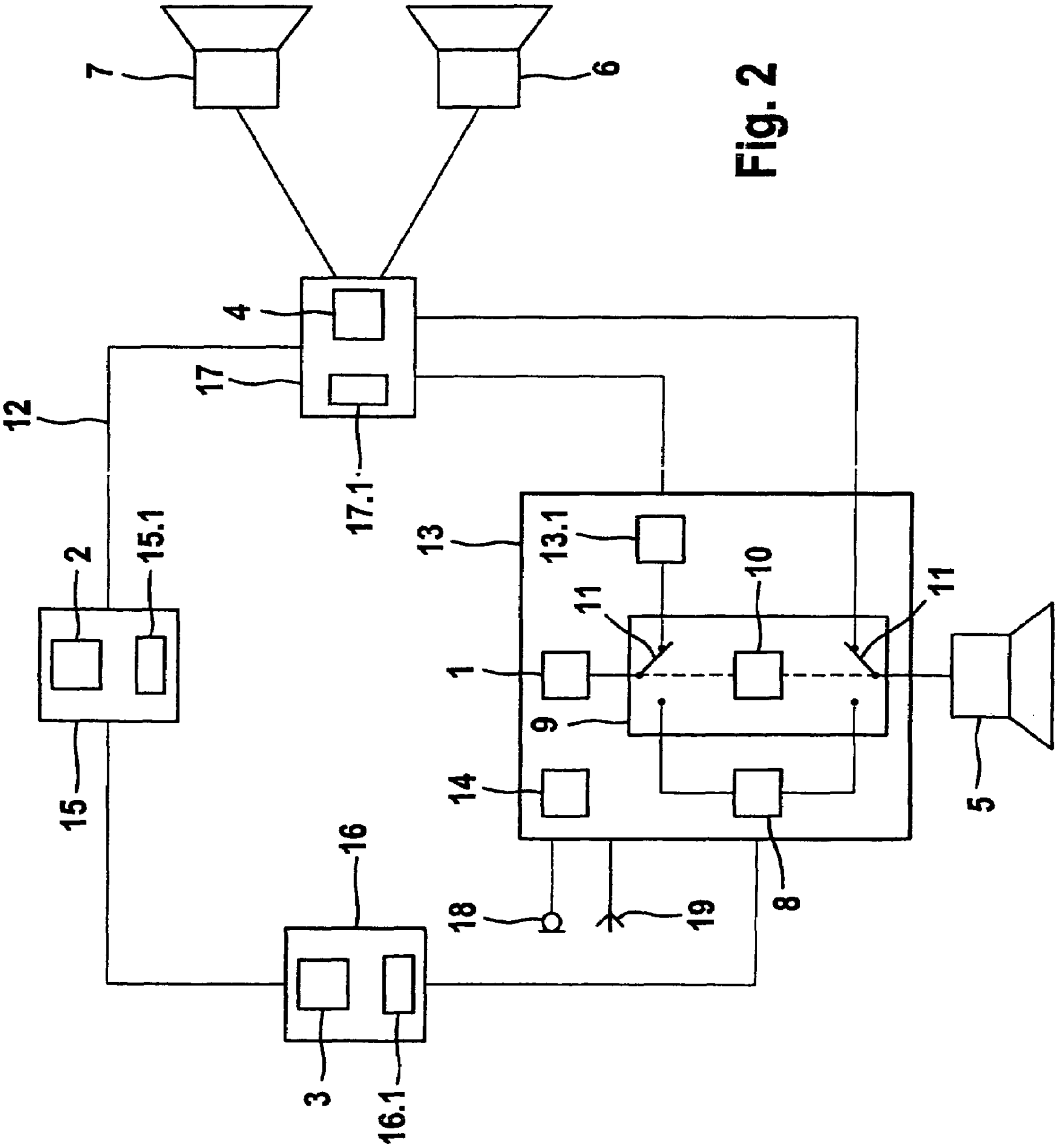
FIG. 2 is a block diagram of an audio system networked via a data bus.

FIG. 2 shows a schematic illustration of an audio system according to the invention, which is networked via a data bus 12 for the interior of a motor vehicle.

An emergency-call control unit 13 comprises a communication unit 14 for setting up a voice link to an emergency-call center, an audio signal source 1 which outputs the voice signals for the voice link, a bus controller 13.1, the amplifier unit 8, and the changeover unit 9 containing the control unit 10 and the changeover switches 11. To set up voice links, it is equipped with a microphone 18 and an antenna 19.

Other units on the data bus, for example, a CD player 15 and a video player 16, comprise the audio signal sources 2 and 3 and bus controllers 15.1 and 16.1. An audio control unit 17 comprises a bus controller 17.1 and the amplifier unit 4. The amplifier unit 4 is in the form of a sound system. It amplifies, filters and processes the audio signals supplied by the data bus and supplies them directly to the speakers 5, 6 and 7. The result is individually settable, very high-quality audio. If the data bus is actually still operational in an emergency, the high-quality amplifier unit 4 is used for the voice link for the purpose of amplifying and outputting the speech, by virtue of the voice signal being passed between the audio source 1 and the speakers 5, 6 and 7 via the primary supply, which comprises the data bus 12 and the amplifier unit 4.

In an emergency, the control unit 10 checks the operability of the primary supply or of parts thereof (for example, the data bus 12, the amplifier unit 4 and/or the speakers 5, 6 and 7). If the primary supply is inoperable, it uses the changeover switches 11 to change over the voice signals from the audio signal source 1 to the secondary supply, which is connected to the speaker unit 5 via the amplifier unit 8. The amplifier unit 8 is provided only for emergencies. That is, it does not afford total convenience or all the setting options of the amplifier unit 4, but is provided as a dedicated unit designed just for this application (speech), and provides a sound appropriate to the emergency. In addition, the amplifier unit 8 is also installed in the housing of the emergency-call control unit 13. Since the latter is installed at a particularly protected location, good crash protection is ensured for the communication module 14, for the changeover unit 11 and for the amplifier unit 8. Since a regular speaker 5 of appropriate size is used for outputting speech in emergencies, the speech quality is better every time than when dedicated, small emergency-call speakers are used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An audio system for a motor vehicle, said audio system comprising:

a plurality of audio signal sources;

a plurality of speaker units to which audio signals from various audio signal sources are supplied; and a plurality of amplifier units of substantially differing quality connected between the audio signal sources and the respective speaker units; wherein, a supply between one of said audio signal sources and one of said speaker units is at least partially redundant, comprising a primary and a secondary supply;

a first, high-quality amplifier unit is provided in the primary supply for the audio signals between said one of said audio signal sources and said one of said speaker units; and a second amplifier unit, which of substantially lesser quality than the first amplifier unit, and which is provided only for emergencies, is provided redundantly in the second supply between said one of said audio signal sources and said one of said speaker units.

2. The audio system according to claim 1, wherein a function check is performed on the primary supply, and the secondary supply is used only if the primary supply determined to be faulty.

3. The audio system according to claim 2, wherein the function check is performed when an emergency is determined to exist.

4. The audio system according to claim 2, wherein the function check is performed on a regular basis.

5. The audio system as claimed in claim 2, wherein changeover between the primary supply and the secondary supply is effected by a changeover unit.

6. The audio system according to claim 1, wherein the primary supply for the audio signals between the audio signal source and the amplifier unit comprises a data bus.

7. The audio system according to claim 1, wherein the at least one audio signal source is installed at a protected location in the vehicle.

8. The audio system according to claim 1, wherein the second amplifier unit is installed at a protected location in the vehicle.

9. The audio system according to claim 1, wherein the at least one speaker unit is installed at a protected location in the vehicle.

10. The audio system according to claim 1, wherein the speaker units comprise redundant units.

* * * * *